US012743832B2

(12) United States Patent
Cafaro et al.

(10) Patent No.: US 12,743,832 B2
(45) Date of Patent: Sep. 22, 2026

(54) 3D RECONSTRUCTION FROM A LIMITED NUMBER OF 2D PROJECTIONS

(71) Applicants: THERAPANACEA, Paris (FR); INSTITUT DE CANCEROLOGIE GUSTAVE ROUSSY, Villejuif Cedex (FR); CENTRE LEON BERARD, Lyons Cedex (FR)

(72) Inventors: Alexandre Cafaro, Paris (FR); Quentin Spinat, Paris (FR); Eric Deutsch, Villejuif Cedex (FR); Vincent Gregoire, Lyons Cedex (FR); Nikos Paragios, Paris (FR)

(73) Assignees: THERAPANACEA, Paris (FR); INSTITUT DE CANCEROLOGIE GUSTAVE ROUSSY, Villejuif (FR); CENTRE LEON BERARD, Lyons (FR)

( * ) Notice: Subject to any disclaimer, the term of this patent is extended or adjusted under 35 U.S.C. 154(b) by 329 days.

(21) Appl. No.: 18/634,076

(22) Filed: Apr. 12, 2024

(65) Prior Publication Data

US 2024/0346713 A1 Oct. 17, 2024

(30) Foreign Application Priority Data

Apr. 12, 2023 (EP) ................................. 23167631.3

(51) Int. Cl.
*G06K 9/00* (2022.01)
*G06T 12/00* (2026.01)

(52) U.S. Cl.
CPC .......... *G06T 12/00* (2026.01); *G06T 2210/41* (2013.01); *G06T 2211/441* (2023.08)

(58) Field of Classification Search
CPC ............................ G06T 12/00; G06T 2210/41
See application file for complete search history.

(56) References Cited

U.S. PATENT DOCUMENTS

2021/0287780 A1* 9/2021 Korani .................. G16H 30/20

OTHER PUBLICATIONS

Jiang, L., Zhang, M., Wei, R., Liu, B., Bai, X., & Zhou, F. (Nov. 2021). Reconstruction of 3d ct from a single x-ray projection view using cvae-gan. In 2021 IEEE international conference on medical imaging physics and engineering (ICMIPE) (pp. 1-6). IEEE. (Year: 2021).*

Corona-Figueroa, A., Frawley, J., Bond-Taylor, S., Bethapudi, S., Shum, H. P., & Willcocks, C. G. Mednerf: Medical neural radiance fields for reconstructing 3d-aware ct-projections from a single x-ray. In 2022 44th annual international conference of the IEEE engineering in medicine & Biology society (Year: 2022).*

Bhadra et al., "Mining the Manifolds of Deep Generative Models for Multiple Fata-Consistent Solutions of III-Posed Tomographic Imaging Problems", arxiv.org, Jul. 26, 2022, 14 pages.

(Continued)

*Primary Examiner* — Molly Wilburn
*Assistant Examiner* — Aidan Keup
(74) *Attorney, Agent, or Firm* — Maier & Maier, PLLC

(57) ABSTRACT

A computer-implemented method for reconstructing a 3D image of a human body part studied of a subject from at least one 2D projection of the human body part studied of the subject and a generative network trained for reconstructing 3D images. The human body part may be the head and/or the neck.

20 Claims, 9 Drawing Sheets

(56) References Cited

OTHER PUBLICATIONS

Bora et al., "Compressed Sensing Using Generative Models", arxiv.org, Mar. 9, 2017, 24 pages.
Dimakis "Deep Generative Models and Inverse Problems", In: "Mathematical Aspects of Deep Learning", Cambridge University Press, Nov. 29, 2022, pp. 400-421.
European Search Report issued on Sep. 21, 2023, in corresponding European Application No. 23 16 7631.3, 1 page.

* cited by examiner

FIG. 9
pre-captured CT
back projection
pre-captured CT
pre-captured CT
Ours
Ground Truth

3D RECONSTRUCTION FROM A LIMITED NUMBER OF 2D PROJECTIONS

FIELD

The present invention relates to image processing and more specifically to a computer-implemented method for reconstructing a 3D image of a human body part from at least one 2D projection of the human body part.

BACKGROUND

Medical imaging is used in order to help diagnose diseases or medical problems on a patient, but also to assess the treatment required by the patient suffering a disease such as cancer. Depending on the region, the nature and the depth of the tissues to observe or to treat, different imaging apparatuses can be used, such as Magnetic Resonance Imaging (MRI), Computed Tomography (CT) scan, X-Ray or ultrasound apparatuses, for example.

Image guided therapies and preoperative planning, especially for radiotherapy which necessitates daily adaptive treatment, require precise patient positioning. Such precise patient positioning is currently determined using tomographic imaging which estimates body density using hundreds of X-ray projections, but it is slow, harmful and costly. Acquisition time may be too high for certain applications, and each projection adds dose to the patient. Thus, a quick, low-cost 3D estimation of internal structures using minimum number of X-rays would revolutionize radiology, benefiting dental imaging, orthopedics, neurology, and more.

Furthermore, this task is an ill-posed inverse problem: X-ray measurements are the result of attenuation integration across the body, which makes them very ambiguous. Traditional reconstruction methods require hundreds of projections to get sufficient constraints on the internal structures. With very few projections, it is very difficult to disentangle the structures for even coarse 3D estimation.

A purpose of the present invention is to provide a method for reconstructing a 3D image of a human body part studied of a subject that overcomes these problems.

SUMMARY

This invention thus relates to a computer-implemented method for reconstructing a 3D image of a human body part studied of a subject from at least one 2D projection of the human body part studied of said subject, said method comprising:

- receiving a first set of latent variables as input data;
- training a generative network based on a library of reference 3D scans of the corresponding human body part to obtain a trained generative model for reconstructing 3D images configured to receive the first set of latent variables as input;
- receiving at least one 2D projection of the human body part studied of the subject;
- obtaining an optimized first set of latent variables by optimizing values of the first set of latent variables by iteratively:
  - i) generating with the trained generative model a synthetic 3D image of the studied human body part using the first set of latent variables;
  - ii) generating at least one synthetic 2D projection of the synthetic 3D image, the at least one synthetic 2D projection being representative of the at least one received 2D projection of the studied human body part;
  - iii) computing an error between the at least one synthetic 2D projection and the at least one received 2D projection of the studied human body part and modifying values of the first set of latent variables for minimizing the error;
- generating a reconstructed 3D image of the studied human body part with the trained generative model using said optimized first set of latent variables.

As previously explained, such method is particularly advantageous enabling to reconstruct a 3D image of the studied human body part from only one projection, or bi-planar projections, minimizing the radiation received by the patient to almost none and offering a quite precise image for, for example:

- non-invasive organ visualization for surgery or radiosurgery;
- patient positioning or treatment adaptation before and during treatment;
- general radiology: visualization of organs for diagnosis, evaluation of organs, their size and evolution, in lungs, dentistry, orthopedics, neurology . . .
- biplanar system enhancement, composed of two orthogonal X-ray tubes that acquire images simultaneously, which would make 3D visualization available with medical advantages and would highly reduce/optimize the costs (i.e. less and/or shorter usage of imaging apparatuses, or potentially more patients under medical care), for all less developed countries and medical centers.

Some other use cases possible include:

- dental and maxillofacial imaging: implant planning, orthodontics, endodontics, periodontal assessments, evaluation of impacted teeth, jaw lesions, and Temporomandibular Joint (TMJ) disorders;
- Ear Nose Throat (ENT) imaging: sinus assessment, auditory system evaluation, airway and sleep apnea analysis, skull base pathologies;
- craniofacial and plastic surgery: pre-operative planning, post-operative assessment, craniofacial deformities, and reconstruction;
- spine and musculoskeletal imaging: spinal disorders, bone density, bone and joint pathologies, orthopedic surgery planning;
- interventional radiology and angiography: vascular anatomy, guidance for biopsies, and pre-operative planning;
- oncology: tumor detection and localization, staging, treatment planning, image-guided radiation therapy and monitoring;
- forensic odontology and anthropology: identification, age and sex estimation, dental and skeletal trauma, and bite mark analysis;
- neurological imaging: brain injuries, tumors, infections, strokes, and congenital abnormalities;
- chest imaging: lung diseases, infections, tumors, blood clots, and heart conditions;
- abdominal and pelvic imaging: gastrointestinal issues, liver and kidney diseases, tumors, and reproductive system disorders;
- musculoskeletal imaging: fractures, bone and joint disorders, degenerative diseases, and soft tissue injuries;
- vascular imaging: blood vessel abnormalities, aneurysms, and blood clots;

trauma assessment: injury evaluation, internal bleeding, and organ damage;

pre-operative planning and post-operative follow-up: surgical guidance, implant placement, and recovery monitoring; and/or research applications: anatomical studies, new surgical techniques, and imaging protocol development.

Furthermore, this approach does not require paired projection reconstruction, which are very tedious to acquire, and this method can be used with different numbers of projection and different projection geometries (e.g. different orientation) without retraining. It allows to retrieve results with finest reconstructions and better matching structures, for variety of number of projections. Finally, this method is fast and robust to sampling ratio, source energy, angles and geometry of projections, all of which making it general for downstream applications and imaging systems.

This invention further relates to a computer-implemented method for reconstructing a 3D image of a human body part studied of a subject from at least one 2D projection of the human body part studied of said subject and at least one 3D radiology image of the human body part studied of the subject. Said method comprising:

receiving a first set of latent variables as input data;

receiving a generative network trained as discussed above;

receiving a trained spatial transformer;

receiving at least one 2D projection of the human body part studied of the subject;

receiving at least one 3D radiology image of the human body part studied of the subject;

obtaining a further optimized first set of latent variables by optimizing values of the first set of latent variables by iteratively:

i. generating with the trained generative model a synthetic 3D image of the studied human body part using the first set of latent variables;

ii. applying a deformable registration of said at least one 3D radiology image to match the synthetic 3D image using a spatial transformer thereby obtaining a deformed 3D radiology image;

iii. generating at least one synthetic 2D projection of the deformed 3D radiology image, the at least one synthetic 2D projection being representative of the at least one received 2D projection of the studied human body part;

iv. computing an error between the at least one synthetic 2D projection and the at least one received 2D projection of the studied human body part and modifying values of the first set of latent variables for minimizing the error;

generating a further reconstructed 3D image of the studied human body part with the trained generative model and said trained spatial transformer using said further optimized first set of latent variables.

The generating of a further reconstructed 3D image may thereby be recovering a further reconstructed 3D image of the studied human body part with the at least one 3D radiology image deformed by the said trained spatial transformer onto the synthetic 3D image of the studied human body part using the trained generative model and said optimized first set of latent variables.

According to other advantageous aspects of the present disclosure, the method includes one or more of the following features, taken alone or in any technically possible combination:

the generative network is one of: a Variational Autoencoder (VAE), a Generative Adversarial Network (GAN), an Autoregressive model (AR), a Flow-based Model (Normalizing Flow), an Energy-Based Model (EBM), a Restricted Boltzmann Machine (RBM), a ladder network, or a diffusion model;

the generative network is a style-based generative adversarial network using 3D convolutions;

a Gaussian noise is added and optimized during the optimization of the first set of latent variables, as a second set of latent variables, the generative model being also configured to receive the second set of latent variables;

the first set of latent variables is a latent vector which is computed from an initial latent vector mapped using a learned network, so that the first set of latent variables controls a global structure of the 3D images generated by the trained generative model at different scales;

the optimization of the first set of latent variables, and of the second set of latent variables when available, is a Bayesian-like optimization;

the at least one synthetic 2D projection, being representative of the at least one received 2D projection of the studied human body part, corresponds to a same anatomic area observed in the received and synthetic projections, which can be defined by same orientation and/or same localization;

the at least one received 2D projection of the studied human body part comprises advantageously between one to hundreds, preferably two to hundreds, and more preferably two 2D projections to a dozen of 2D projections, and wherein for each received 2D projection acquired a corresponding and representative synthetic 2D projection is generated during step ii;

the received 2D projections of the studied human body part are different, being acquired by different imaging apparatuses, or by the same apparatus with different orientations, e.g. according to the sagittal, axial and/or coronal orientation, and/or at different time intervals, e.g. before or after the application of a treatment such as a radiotherapy;

the library of reference 3D scans of the corresponding human body part is preprocessed to identify a region of interest corresponding to a specified anatomic area comprising the studied human body part, before the training step, and the at least one received 2D projection is preprocessed in the same way;

the library of reference 3D scans of the corresponding human body part is preprocessed to normalize the human body part 3D scans, before the training step, and the at least one received 2D projection of the studied human body part is normalized on the same ranging scale;

the method further comprises:

receiving a 3D image of the human body part studied of the subject; and an initialization step wherein, before optimizing values of the first latent variables:

a first synthetic 3D image is generated by the trained generative model;

the first synthetic 3D image and the received 3D image are compared; and the initial values of the first latent variables, and/or of the second set of latent variables when available, are initialized by minimizing a different between the first synthetic 3D image and the received 3D image;

the library of reference 3D scans used to train the generative network is a library of computed tomography scans;

the studied human body part is head and/or neck.

The present disclosure also relates to device comprising a processor configured to carry out the method according to any one of the embodiments described hereabove.

The present disclosure also relates to a therapy method wherein a 3D image of a human body part of a patient requiring therapy, like radiotherapy, is reconstructed by implementing the method according to any one of the embodiments described hereabove, in order to keep track of the impact of the therapy and/or adapt treatment such as planning the radiotherapy.

The present disclosure also relates to a computer program product comprising instructions which, when the program is executed by a computer, cause the computer to automatically carry out the steps of the method according to any one of the embodiments described hereabove (i.e. the instructions may cause the computer to carry out the steps of the method according to a single one of those embodiments, or any two or more of those embodiments).

The present disclosure also relates to a non-transitory computer readable storage medium comprising instructions which, when the storage medium is read by a computer, cause the computer to carry out the steps of the method according to any one of the embodiments described hereabove.

Such a non-transitory program storage device can be, without limitation, an electronic, magnetic, optical, electromagnetic, infrared, or semiconductor device, or any suitable combination of the foregoing. It is to be appreciated that the following, while providing more specific examples, is merely an illustrative and not exhaustive listing as readily appreciated by one of ordinary skill in the art: a portable computer diskette, a hard disk, a ROM, an EPROM (Erasable Programmable ROM) or a Flash memory, a portable CD-ROM (Compact-Disc ROM).

Definitions

In the present disclosure, the following terms have the following meanings:

"Human body part" refers to a part of a human body, for example:

- a member (e.g., head, trunk, arm, leg . . . );
- a system (e.g., cardiovascular, circulatory, digestive, endocrine, locomotor, nervous, reproductive, respiratory, sensory, urinary . . . );
- an organ (e.g., brain, heart, spleen, stomach, intestines, colon, bladder, pancreas, kidney, liver, lungs, thyroid, genitals . . . ); or
- a tissue (muscle, nervous, connective, epithelial . . . ).

"Library of reference 3D scans of a human body part considered" refers to a library of 3D scans of the human body part considered which may come from different patients, healthy or having a pathology in the human body part considered. Furthermore, the 3D scans of reference may be preferably Computed Tomography (CT) scans. It may also be Magnetic Resonance Imaging (MRI) scans for example but not restricted to. The library of reference 3D scans comprises only 3D scans of the same type (e.g. only CT scans, or only one modality of MRI scans, T1 or T2 for example). Furthermore, 3D scans or 3D images may be composed of a plurality of 2D images that represent sections or slices of the human body part considered.

"Processor" should not be construed to be restricted to hardware capable of executing software, and refers in a general way to a processing device, which can for example include a computer, a microprocessor, an integrated circuit, or a programmable logic device (PLD). The processor may also encompass one or more Graphics Processing Units (GPU), whether exploited for computer graphics and image processing or other functions. Additionally, the instructions and/or data enabling to perform associated and/or resulting functionalities may be stored on any processor-readable medium such as, e.g., an integrated circuit, a hard disk, a CD (Compact Disc), an optical disc such as a DVD (Digital Versatile Disc), a RAM (Random-Access Memory) or a ROM (Read-Only Memory). Instructions may be notably stored in hardware, software, firmware or in any combination thereof.

"Sagittal plane" refers to a plane that divides the body into left and right, i.e. a plane orthogonal to the right and left axis. "Frontal plane" or "coronal plane" refers to a plane that divides the body into front and back, i.e. a plane orthogonal to the ventral-dorsal/anterio-posterio axis. "Transverse plane" or "horizontal plane" refers to a plane that is orthogonal to the sagittal and frontal planes, i.e. a plane orthogonal to the craniocaudal axis or a plane parallel to the ground.

"Deformable registration" is a process in medical imaging that aligns images by establishing spatial transformations. Unlike rigid and affine registration, which deal with simpler transformations (such as rotation, translation, scaling, and shearing), deformable registration tackles more complex transformations. These deformations can be large and involve intricate spatial changes.

BRIEF DESCRIPTION OF THE DRAWINGS

The present disclosure will be better understood, and other specific features and advantages will emerge upon reading the following description of particular and non-restrictive illustrative embodiments, the description making reference to the annexed drawings wherein.

On the figures, the drawings are not to scale, and identical or similar elements are designated by the same references.

DETAILED DESCRIPTION

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein may represent conceptual views of illustrative circuitry embodying the principles of the disclosure. Similarly, it will be appreciated that any flow charts, flow diagrams, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, a single shared processor, or a plurality of individual processors, some of which may be shared.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces.

First Embodiment of the Method

Figure 1:
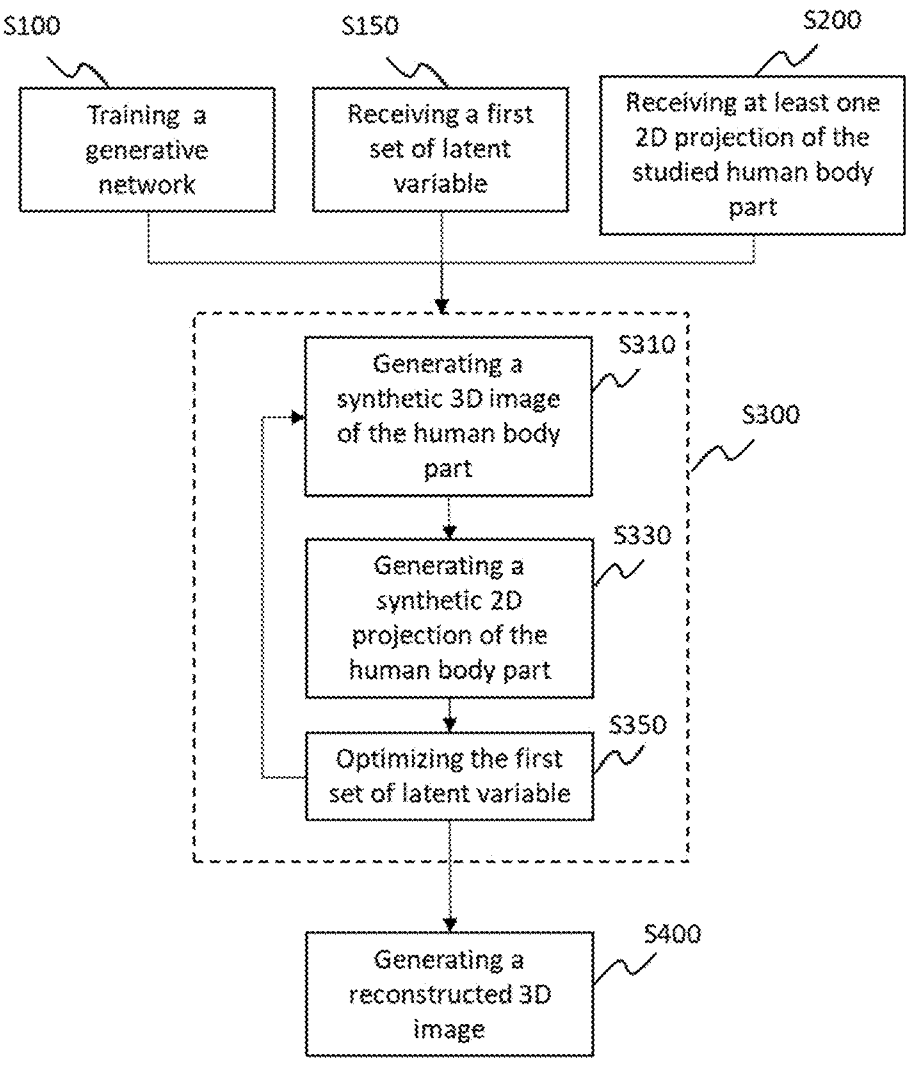
FIG. 1 is a schematic representation of a first embodiment of a method for reconstructing a 3D image of a human body part studied of a subject from at least one 2D projection of the human body part studied of said subject.

According to a first embodiment, a computer-implemented method for reconstructing a 3D image of a human body part studied of a subject, from at least one 2D projection of the human body part studied of said subject, is shown in FIG. 1.

The method comprises five main steps:

a training step S100;

a first receiving step S150 a second receiving step S200 an optimization step S300; and a generating step S400.

Training step S100

During the training step S100, a generative network is trained on a library of reference 3D scans of the corresponding human body part, so as to obtain a generative model for reconstructing 3D images configured to receive a first set of latent variables as input. This enables to regularize the domain space of solutions and to learn deep prior of anatomic structures comprised in the human body part considered.

As described in the definitions, the library of reference 3D scans is preferably Computed Tomography (CT) scans which offer information about the density of the tissues of the human body part studied. It could also be other types of 3D scans like Magnetic Resonance Imaging (MRI) scans for example but not restricted to, provided that these 3D scans offer sufficient information on the density of the tissues. In the case of MRI scans a preprocessing of these 3D scans should be done to introduce the information on the density like, for example, translating MRI scans into CT scans using a machine learning model. The library of reference 3D scans comprises only 3D scans of the same type (e.g. only CT scans, or only MRI scans, T1 or T2 for example), and the human body part considered may be a member, such as head and/or neck for example, a system, an organ, or a tissue.

For example, the generative network may be one of: a Variational Autoencoder (VAE), a Generative Adversarial Network (GAN), an Autoregressive model (AR), a Flow-based Model (Normalizing Flow), an Energy-Based Model (EBM), a Restricted Boltzmann Machine (RBM), a ladder network, or a diffusion model.

Preferably, the generative network is a generative adversarial network, particularly a Style-GAN2 extended in 3D by changing the 2D convolutions into 3D as done in 3DStyleGAN. Such type of generative adversarial network also takes a random Gaussian noise as input which may represent another second set of latent variables, allowing more fine-grained details in the 3D image generated.

First Receiving Step S150

The first receiving step S150 consists in receiving a first set of latent variables comprising values. In some embodiments a second set of latent variables is also received. In this case, the generative model is configured to receive the first and second sets of latent variables.

Advantageously, the first set of latent variables may be a latent vector computed from an initial latent vector mapped using a learned network, so that the first set of latent variables controls a global structure of the 3D images generated by the generative model at different scales.

Advantageously, when the generative network also takes a random Gaussian noise (as denoted by noise vectors n below) as input representing the second set of latent variables, this second set of latent variables is also optimized during the optimization step S300. This allows obtaining high-resolution (fine-grained) details.

In these embodiments, the generative network comprises a generator G that generates volume v given a latent vector w and Gaussian noise vectors $n=\{n_j\}_j$: $v=G(w, n)$. Latent vector $w \in N(w|\mu, \sigma)$ is computed from an initial latent vector z E N (0, I), which corresponds to the first set of latent variables, mapped using a learned network m: $w=m(z)$. w controls the global structure of the predicted volumes at different scales by its components $w_i$, while the noise vectors n allow more fine-grained details. The mean u and standard deviation $\sigma$ of the mapped latent space can be computed by mapping over initial latent space N (0, I) after training. The mapping network learns to disentangle the initial latent space relatively to semantic features which is crucial for the inverse problem.

Furthermore, the model is trained using non-saturating logistic loss and path length regularization, and the discriminator is a non-saturating logistic loss with R1 regularization implemented with adaptative discriminator augmentation inspired by StyleGAN-ADA to improve learning of the model's manifold with limited medical imaging data.

Advantageously, before the training step S100, the library of reference 3D scans of the corresponding human body part may be preprocessed to identify a region of interest corresponding to a specified anatomic area comprising the studied human body part, and/or to normalize the human body part 3D scans.

Advantageously, to reconstruct a 3D image of a studied human body part of a subject, the step of training the generative network S100 can only be done once to produce the generative model corresponding to said human body part studied. Thus, if the patient/subject changes, it will not affect step S100. However, if the human part studied changes (e.g. from head and neck to thorax or arms), the training step S100 need to be processed again, so as to generate the generative model corresponding to this new body part studied, and with the appropriate library of reference 3D scans.

Second Receiving Step S200

During the second receiving step S200, at least one 2D projection of the human body part studied of the subject is received. For example, the at least one received 2D projection may be one or more X-ray images of the subject, the X-ray images comprising the human body part studied. Advantageously, the at least one received 2D projection may come from biplanar system that enables to acquire simultaneously two X-ray images in orthogonal planes.

Advantageously, the at least one received 2D projection of the human body part comprises between one to hundreds, preferably between two to hundreds, or more preferably between two to a dozen of 2D projections. The more 2D projections the better the 3D reconstruction is but a compromise must be made between the quality of the reconstruction, the quantity of the image (potentially the X-ray dose received by the subject), and the processing time required. Current solutions do not allow for a good quality reconstruction with very few images, unlike the present method. An example of optimal 3D reconstruction having a good resolution with minimum radiation and minimum time processing is acquiring simultaneously two projections with orthogonal planes such as: sagittal and frontal, sagittal and transversal, or frontal and transversal for example, by using a biplanar X-ray apparatus. It is to be noted that obliques views or other projections having quite separate angles of view may give good results too.

In the case where the library of reference 3D scans of the corresponding human body part is preprocessed to identify a region of interest corresponding to specified anatomic area comprising the studied human body part, and/or to normalize the scans before the training step (S100), the same processing may be done on the at least one received 2D projection so as to have comparable and compatible images.

Particularly, the human body part acquired in the 2D projection(s) received may not be positioned as after preprocessing for training the generative model from the library of 3D scans of reference.

To match the human body part acquired in the 2D projection(s) received and well position the reconstruction by the trained generative model with the received 2D projection(s), a registration step is preferable before doing the optimization for reconstruction S300.

It consists in optimizing a 3D rigid matrix for 2D-3D registration.

If a previous 3D image of the patient is available, this 3D image is preprocessed as for training the generative network (crop on the zone of interest), then synthetic projections are generated and the error between generated projections with input 2D projections of the day is compared. The rigid matrix parameters are then optimized by gradient descent to minimize the error, i.e. a L1 or L2 loss.

If no prior 3D image is available, a raw 3D image is generated by using the mean of the latent space of the first variable and a random gaussian noise (second set of latent variables): from this coarse 3D realistic anatomy, the same optimization as described before is done. This optimization is set to position the output of the generative model with the received 2D projection(s).

Optimization Step S300

During the optimization step S300, values of the first set of latent variables (respectively values of the second set of latent variables, when available) used as input for the trained generative model are optimized.

Advantageously, the first set of latent variables (and the second set of latent variables when available, i.e., in the embodiments where a second set of latent variables is also received as discussed above) may be optimized by iteratively carrying out the following sub-steps:

- generating, with the generative model obtained at the end of the training step S100, a synthetic 3D image of the studied human body part using the first set of latent variables (and the second set of latent variables when available), which corresponds to sub-step S310;
- generating at least one synthetic 2D projection of the synthetic 3D image obtained at the end of sub-step S310, which corresponds to sub-step S330 and wherein the at least one synthetic 2D projection is representative of the at least one 2D projection of the studied human body part received during the second receiving step S200; and
- computing an error between the at least one synthetic 2D projection obtained at the end of sub-step S330 and the at least one received 2D projection of the studied human body part, and modifying the values of the first set of latent variables (and respectively values of the second set of latent variables when available) for minimizing the error, which corresponds to sub-step S350. This modified set of latent variables corresponding to the optimized first set of latent variables (respectively the optimized second set of latent variables).

Advantageously, the optimization step S300 can follow a Bayesian formulation or a more general one consisting in exploring latent space with gradient descent meant for minimizing the difference between the synthetic projections and real/received projections. The optimization could be done without additional regularization as the latent space is quite regularized itself.

Preferably, the optimization step S300 uses a Bayesian-like optimization which consists in finding the maximum a posteriori estimate over the first set of latent variables (and the second set of latent variables when available) and given the projections: the at least one 2D projection acquired and the corresponding at least one 2D synthetic projection of the human body part studied.

To formulate the problem, a small set of projections $\{I_i\}_i$ is considered to reconstruct the 3D tomographic volume v that generates these projections, wherein i is an integer superior or equal to 1. To solve this hard ill-posed problem, prior knowledge about the possible volumes is needed. To do this, the maximum a posteriori (MAP) is estimate given the projections $\{I_i\}_i$ (Eq. 1):

$$v^* = \arg\max_v p(v \mid \{I_i\}_i) = \arg\max_v p(v)p(\{I_i\}_i \mid v) = \arg\min_v \sum_i L(v \mid I_i) + R(v)$$

wherein the term $\Sigma_i L(v|I_i)$ is a log-likelihood, taken as (Eq. 2):

$$L(v \mid I_i) = \lambda_2 \|A_i \circ v - I_i\|_2 + \lambda_p L_p(A_i \circ v, I_i)$$

where: $A_i$ is an operator that projects volume v under view i; $L_p$ is a perceptual loss between projection of v and the observed projection $I_i$; term R (v) is a regularization term. It is crucial as it is the term that embodies prior knowledge about the volume to reconstruct.

In the case where the generative model provides a volume v as a function of vectors w and n, the optimization from Eq. 1 may be reparametrized into (Eq. 3):

$$w^*, n^* = \arg\min_{w,n} \sum_i L(G(w, n), I_i) + R(w, n)$$

It is to be noted that, in this example, the noise vectors n are advantageously also optimized, because it was discovered in the early experiments, that the n are useful to embed high-resolution details.

In these embodiments, the regularization term R (w, n) is taken as follow (Eq. 4):

$$R(w, n) = \lambda_w L_w(w) + \lambda_c L_c(w) + \lambda_n L_n(n)$$

wherein term $L_w(w) = -\Sigma_k \log N(w_k|\mu, \sigma)$ ensures that w lies on the same distribution as during training. $N(\cdot|\mu, \sigma)$ represents the density of the standard normal distribution of mean u and standard deviation $\sigma$.

In addition, term $L(w) = -\Sigma_{i,j} \log M(\theta_{i,j}|0, \kappa)$ encourages the $w_i$ vectors to be collinear so to keep the generation of coarse-to-fine structures coherent. $M(\cdot; \mu, \kappa)$ is the density of the Von Mises distribution of mean u and scale K, which are taken fixed, and $$\theta_{i,j} = \arccos\left(\frac{w_i \cdot w_j}{\|w_i\|\|w_j\|}\right)$$

is the angle between vectors $w_i$ and $w_j$.

Here, term $Ln(n) = -\Sigma_j \log N(n_j|0, I)$ ensures that the $n_j$ lie on the same distribution as during training, i.e., a multivariate standard normal distribution. The $\lambda$ are fixed weights.

Regarding the projection operator (for example, for any $A_i$ described above), in some embodiments, A may be taken as a 3D cone beam projection that simulates (i.e., mimics) X-ray attenuation across the patient, for example. In this notation, A denotes a general projector operator, while $A_i$ is said general projector angle/view i which follows the same principle and merely comprises shifting the origin and direction. A realistic X-ray attenuation as a ray-tracing projection using material and spectrum awareness may be modeled as follow (Eq. 5):

$$I_{atten} = \sum_E I_0 e^{-\Sigma_m \mu(m,E) t_m}$$

wherein: $\mu(m, E)$ is the linear attenuation coefficient of material m at an energy state E that is known, $t_m$ is the material thickness, and $I_0$ is the intensity of the source X-ray. For materials, bones and tissues separated by threshold on electron density. A inverts the attenuation intensities $I_{atten}$ to generate an X-ray along few directions successively. Advantageously, A is or is made differentiable to allow end-to-end optimization for reconstruction.

In sub-step S330, what is meant by "the first at least one synthetic 2D projection being representative of the at least one received 2D projection of the studied human body part" is that the synthetic 2D projections are obtained as if the synthetic 3D image of the human body part was acquired in the same manner as the real human body part studied in step S200. For example, it corresponds to a same anatomic area observed in the received and synthetic projections, which can be defined by same orientation and/or same localization. Traditional orientations are sagittal, axial or coronal view but other orientations may be used.

As described before, the at least one received 2D projection of the studied human body part advantageously comprises between one to hundreds, preferably two to hundreds, and more preferably two 2D projections to a dozen of 2D projections, and for each received 2D projections a corresponding and representative second synthetic 2D projection is generated during sub-step S330.

Advantageously, these three sub-steps S310, S330 and S350 may be repeated several times, preferably about 10 to 100 times, or for a certain calculation time such as from about 10 seconds to 1 minute, the latest set of latent variables obtained corresponding to the optimized first set of latent variables (respectively to the optimized second set of latent variables).

Generating Step S400

The generating step S400 consists in generating a reconstructed 3D image of the studied human body part with the generative model obtained at the end of the training step S100, by using the optimized first set of latent variables (and optimized second set of latent variables when available) obtained at the end of the optimization step S300.

It is to be noted that the reconstructed 3D image of the studied human body part generated by the present method does not require paired projections-reconstructions as for some methods, but which are very tedious to acquire. Furthermore, the reconstructed 3D image of the studied human body part generated by the present method may be obtained with different numbers of projections and different projection geometries without retraining the generative network.

Second Embodiment of the Method

Figure 2:
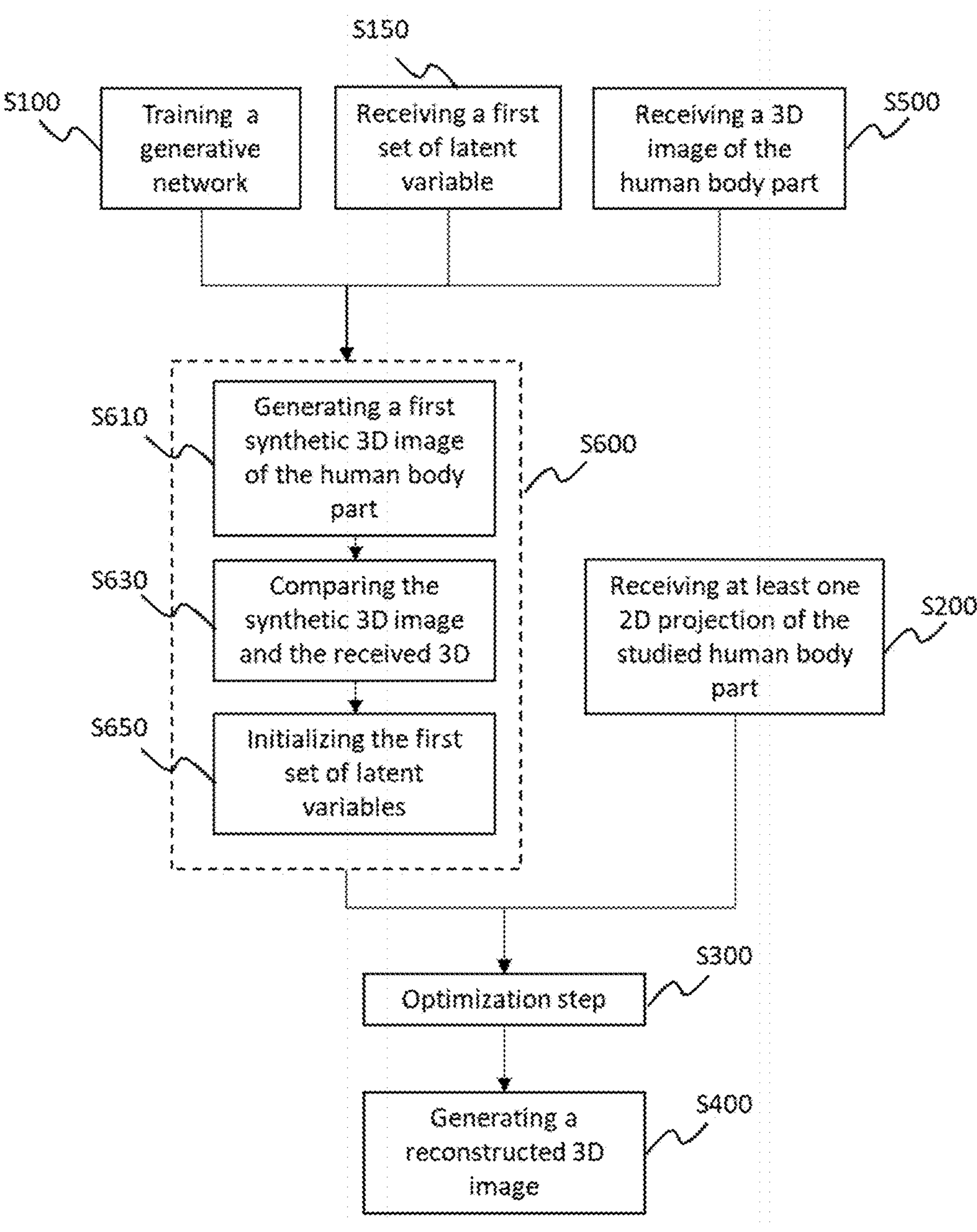
FIG. 2 is a schematic representation of a second embodiment of the method for reconstructing a 3D image of a human body part studied of a subject from at least one 2D projection of the human body part studied of said subject.

According to a second embodiment, a computer-implemented method for reconstructing a 3D image of a human body part studied of a subject, from at least one 2D projection of the human body part studied of said subject, is shown in FIG. 2.

The method comprises seven main steps:

a training step S100 similar to the one previously described;

a first receiving step S150 similar to the one previously described;

a 3D receiving step S500;

a second receiving step S200 similar to the one previously described;

an initializing step S600;

an optimization step S300 similar to the one previously described; and a generating step S400.

3D Receiving Step S500:

In this second embodiment, a 3D image of the human body part studied of the subject is receiving. For example, it can be the 3D scan that helped diagnose a medical problem on the subject and conducted to process to a radiotherapy treatment of the human body part studied, or it can be a 3D scan control before or after a treatment, or else a previous 3D scan comprising the human body part studied.

In the case where the library of reference 3D scans of the corresponding human body part is preprocessed to identify a region of interest corresponding to specified anatomic area comprising the studied human body part, and/or to normalize the scans before the training step (S100), the same processing may be done on the received 3D image of the human body part studied of the subject, so as to have comparable and compatible images.

Initialization Step S600:

During the initialization step S600, the 3D image of the human body part studied received is compared to a first synthetic 3D image generated by the trained generative model so as to initialize the first set of latent variables, and the second set of latent variables when available, before the optimization step S300.

The initialization step S600 may comprise the following sub-steps:

generating a first synthetic 3D image of the human body part, corresponding to sub-step S610;

comparing the first synthetic 3D image and the received 3D, corresponding to sub-step S630; and initializing the first set of latent variables, and the second set of latent variables when available, by minimizing a different between the first synthetic 3D image and the received 3D image, corresponding to sub-step S650.

The first set of latent variables, and the second set of latent variables when available, may be optimized in the same manner as previously described, i.e. by using Bayesian-like optimization, so as to minimize the difference between the first synthetic 3D image and the received 3D image.

This initialization saves time and enables to have a more precise 3D reconstructed image and thus more precise positioning of the subject, when the subject comes to receive a treatment and at least one 2D projection of the human body part to treat is acquired to determine the appropriate dose and the right positioning, for example.

Third Embodiment of the Method

According to a third embodiment, a computer-implemented method for reconstructing a 3D image of a human body part studied of a subject, from at least one 2D projection of the human body part studied of said subject and at least one 3D radiology image of the human body part studied of the subject.

In examples, the at least one 3D radiology image may be a Computed Tomography (CT) scan or a conversion of an MRI into a CT scan. Said conversion may be obtained by any known method in the literature. Said at least one 3D radiology image may be a reference image at a given time before the treatment. The method according to this third embodiment, comprises receiving a first set of latent variables as input data as discussed above. In examples, this step of receiving may comprise an initialization as discussed above. This step of receiving may also comprise one or more iterations of the optimization of the first set of latent variables according to according to the first or second embodiment as discussed above.

In other words, this third embodiment may be a step of further optimization of the first set of latent variables (and the second set of latent variables when available as discussed above). In such examples, the method starts upon one or more iterations (e.g., before the convergence or upon the termination/convergence) of a method according to the first or second embodiment as discussed above. In yet other words, the method according to the first or the second embodiment may be used as a warm-up step for the method according to the third embodiment. This warm-up step is discussed in more detail below.

These examples are beneficial as they break down the optimization into two steps, i.e., a general optimization without deforming the received 3D radiology image, and a refining step which uses the result of the general optimization as its initial conditions and further optimizes the results of the general optimization.

In examples, this third embodiment may be integrated into the optimization of the first set of latent variables (and the second set of latent variables when available as discussed above) as discussed above. In such examples, the steps discussed herein may be a part of the step of the first and the second embodiments discussed above.

In any example according to the third embodiment, the method received a trained spatial transformer (in accompany with longitudinal data, CT and subsequent CBCT-CT). Said spatial transformer may be trained using any known method in the field. An example of such a spatial transformer is discussed hereinbelow.

Below a detailed example according to the third embodiment is discussed. First, the approach is formalized and then each of its components is described.

Problem Formulation

Given a limited set of projections $\{I_i\}_i$, potentially as few as two, the objective is to reconstruct the 3D tomographic volume v responsible for these projections. In practice, a previously-captured volume $v^-$ is available. Between $v^-$ and v are both rigid and non-rigid transformations, as well as more complex transformations such as tumor growing or shrinking. We thus seek the transformation of $v^-$ to v.

Since this problem is ill-posed in general, priors are introduced on how volumes deform and on the deformed volume itself. The following formulation is proposed:

$$g^* = \mathrm{argmin}_g \sum_i \mathcal{L}_i(S(v^-, v(g)), I_i) + \mathcal{R}(g)$$

where $v(g)$ is a generative model of volumes of parameters g, i.e., $v(g)$ is a generated volume. This generative model allows to enforce more easily regularization term $R(g)$ on volumes. $S(v^-, v(g))$ is a spatial transformer trained to directly predict the transformation between two volumes. Here, $S(v^-, v(g))$ returns volume $v^-$ after deformation to align on the generated volume with the deformation consistent with training data. $L_i$ is a loss term that compares the projections of deformed volume $S(\nu^-, \nu(g))$ with the input projections $I_i$. The definition of the loss term is as $L(\nu|I_i)$ as discussed above.

Figure 8:
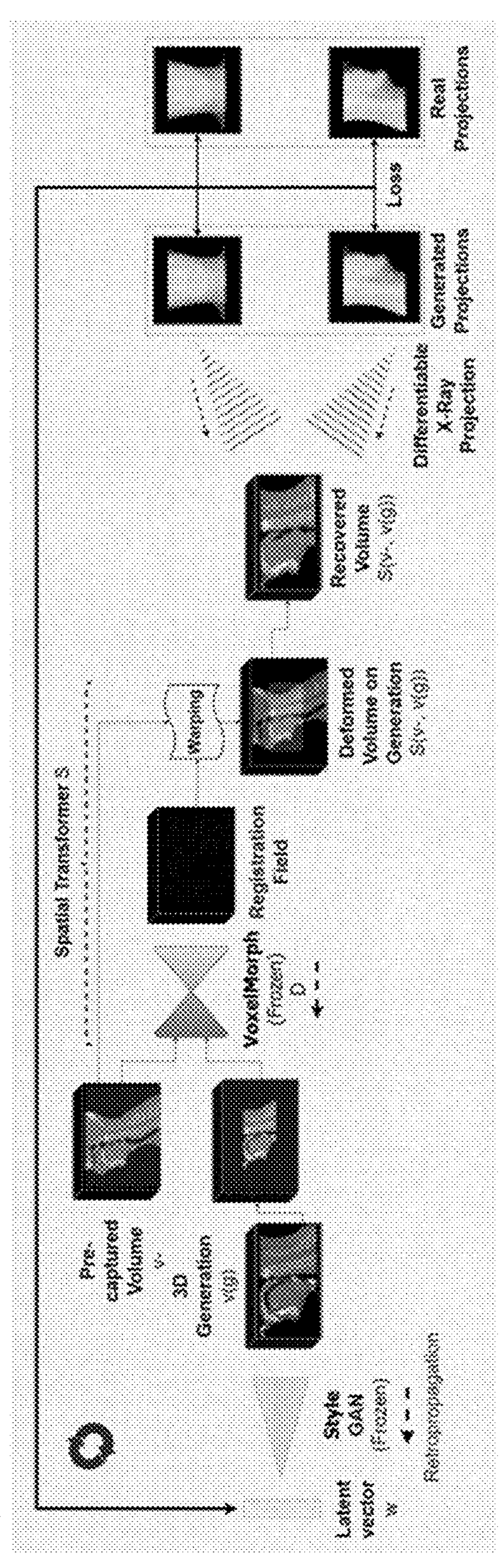
FIG. 8 is a schematic representation of a third embodiment of the method for reconstructing a 3D image of the head and neck of a subject, from at least one 2D projection of the human body part studied of said subject and at least one 3D radiology image of the human body part studied of the subject.

The optimization on g generates a volume $\nu(g)$ that guides the deformation of $\nu^-$ thanks to the first term and exploits prior knowledge on volumes to recover. After optimization, our method returns $S(\nu^-, \nu(g))$ the pre-acquired volume after deformation. FIG. 8 illustrates the pipeline that implements this approach. First, the generative model $\nu(g)$ as well as spatial transformer S are trained, both in an unsupervised way. Given two input projections, then the parameters g of the generative model, which gives deformed volume $S(\nu^-, \nu(g))$ are optimized.

Generative Model

The generative model $\nu(.)$ is learnt using GANs. The parameters g are decomposed into a latent vector w and Gaussian noise vectors $n=\{n_j\}_j$: $g=[w, n]$. Latent vector $w \in N(w|\mu, \sigma)$ is computed from an initial latent vector $z \in N(0, I)$ mapped using a learned network m: $w=m(z)$. w controls the global structure of the predicted volumes at different scales by its components $w_i$, while the noise vectors n allow more fine-grained details. Mean u and standard deviation $\sigma$ of the mapped latent space can be computed by mapping over initial latent space $N(0, I)$ after training.

The optimization is realized on the noise vectors n as well. It has been noticed that the n are also useful to embed high-resolution details.

To ensure that generated volume remains in the manifold of possible volumes, we define R (g) as a sum of regularization terms on w and n as discussed above in Eq. (4):

$$R(g) = R(w, n) = \lambda_w L_w(w) + \lambda_c L_c(w) + \lambda_n L_n(n).$$

Spatial Transformer

The spatial transformer model is a deformable registration model to match the received 3D image with the synthetic 3D. The spatial transformer S can be decomposed into:

$$S(\nu_1, \nu_2) = W(\nu_1, D(\nu_1, \nu_2))$$

where $D(\nu_1, \nu_2)$ is a deep network predicting a deformation field from $\nu_1$ to $\nu_2$; $W(\nu_1, D(\nu_1, \nu_2))$ deforms volume $\nu_1$ according to the deformation field predicted by D. The architecture of the spatial transformer is inspired by VoxelMorph. The model D is trained to predict deformation W between two volumes $\nu_1$ and $\nu_2$ by minimizing $$\lambda_s \|\nu_2 - W(\nu_1, D(\nu_1, \nu_2))\|^2 + \lambda_D \|\nabla D(\nu_1, \nu_2)[x]\|^2$$

over a training set of corresponding volumes $\{(\nu_1, \nu_2)\}$.

The second term is a smoothing loss that mitigates sharp local fluctuations and promote smoothness of the predicted field. $\lambda_s$ and $\lambda_D$ are balancing weights that adjust the emphasis between similarity and regularization during training.

Maintaining 1-to-1 mapping in medical image registration is crucial to prevent tearing or overlapping. The model inspired by the VoxelMorph approach, predicts a velocity field. By integrating this velocity field over time, a smooth, invertible transformation is obtained that naturally avoid singularities. This approach ensures the deformation remains diffeomorphic.

Warm-Up

Before optimizing to solve for g*an initial volume estimate $\nu(g)$ is retrieved by performing several gradient descent steps of objective $$\sum_i \mathcal{L}_i(S(\nu^-, \nu(g)), I_i) + \mathcal{R}(g)$$

starting from random initialization for g. The number of iterations may be 10 iterations in practice. This provides a better initialization for g before optimization starts and thereby speeds up convergence. In other words, the warmup step comprises few steps as initialization of the method according to the second embodiment.

Manifold Learning

To impose anatomical constraints on the domain space of potential solutions, a style-based generative model adept at capturing deep anatomic priors is used. This is realized through the adaptation of StyleGAN2, which is evolved to 3D by substituting 2D convolutions with their 3D counterparts, echoing the approach in 3DStyleGAN, but rooted in the StyleGAN2 framework.

The model's mapping network is tailored to tease apart the latent space based on semantic attributes, a feature pivotal for addressing inverse problems. This model is trained employing a non-saturating logistic loss, supplemented with path length regularization. For its discriminator component, the method harnesses the non-saturating logistic loss, complemented by R1 regularization. To further expand the learning scope in the context of limited medical imaging data, adaptive discriminator augmentation as detailed in StyleGAN-ADA is leveraged.

EXAMPLES

Figure 3:
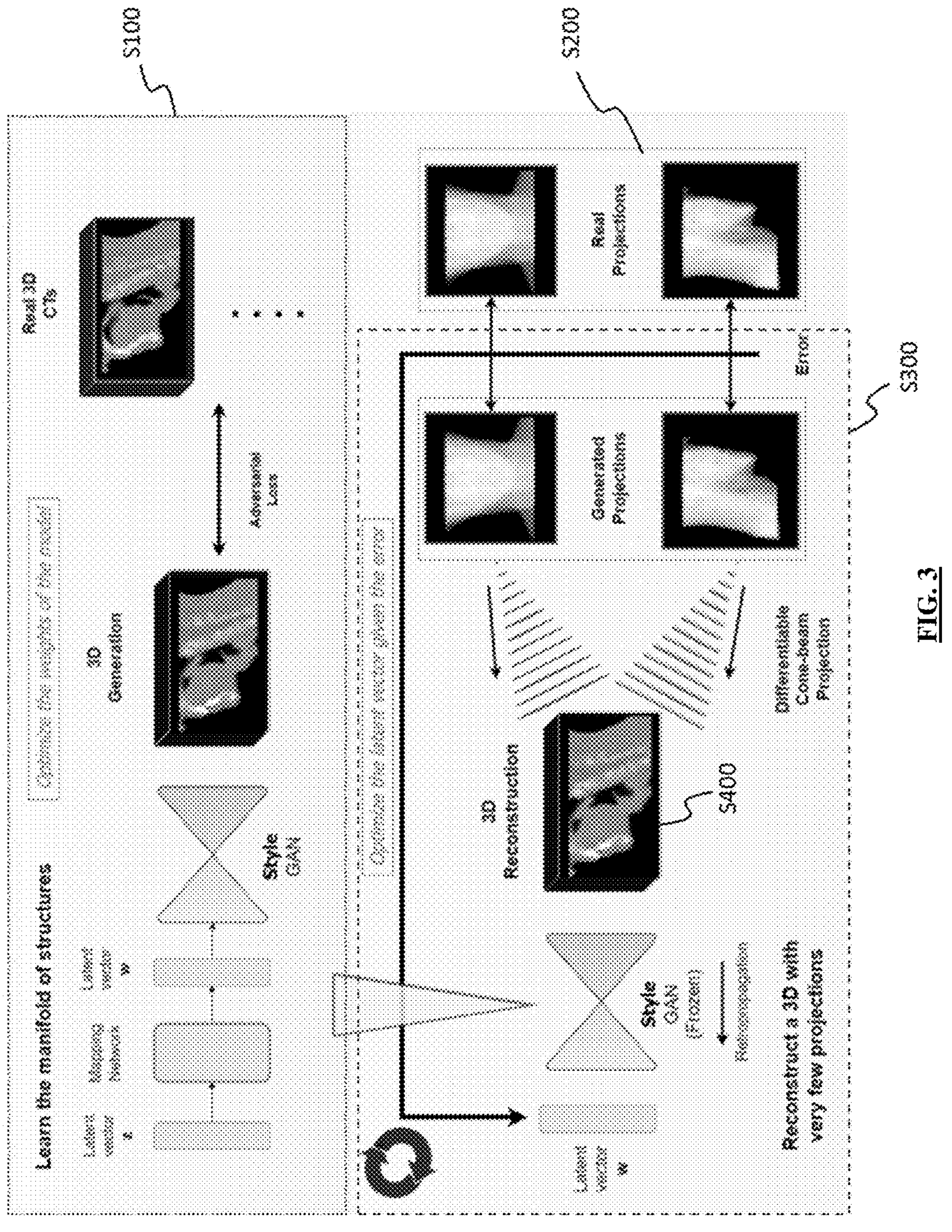
FIG. 3 is schematic representation of an application of the method for reconstructing a 3D image of the head and neck of a subject.

FIG. 3 illustrates an application of the method as previously described for reconstructing a 3D image of the head and neck of a subject.

A library of 3D Computed Tomography (CT) scans is used to train the generative network which receives as input a latent vector z. A mapping network transforms the latent vector z into a latent vector w so that w controls the global structure of the predicted volumes generated by the StyleGAN at different scales. Weights are also optimized during the training.

In the present case, two X-ray images of the head and neck of the subject are received S200: one frontal X-ray image and one sagittal X-ray image.

Then the latent variable w is optimized several times S300 by:

generating a synthetic 3D image of the head and neck;

generating two synthetic projections of the 3D synthetic image of the head and neck: one frontal projection and one sagittal projection;

computing a first error between the real/received and synthetic frontal projections and a second error between the real/received and synthetic sagittal projections (NB: a general error can be computed instead of an error for each pair of projections compared); and modifying the latent vector w so as to minimize the first and second error (respectively minimizing the general error at each iteration);

until an optimized latent variable $w_{opt}$ is found (after a predetermined number of iterations for example or after a predetermined computer processing time), and a reconstructed 3D image of the head and neck of the subject is generated by the trained generative model using the optimized latent variable $w_{opt}$ S400.

Another exemplary implementation of the method for reconstructing a 3D image of a human body part studied of a subject has been realized and is now described.

FIG. 8 illustrates an application of an embodiment of the method as previously described for reconstructing a 3D image of the head and neck of a subject. Said embodiment recovers a 3D volume from biplanar X-Rays and a pre-acquired volume. In the presented example, the images and the volume are related to the head and neck of the subject.

First, a generative model to generate 3D volumes in a low-dimensional manifold and a 3D/3D deformable registration model between two volumes is trained. Now, given two projections and a pre-captured volume of the patient, a 3D volume corresponding to the two projections by finding the latent vectors that generate the best 3D volume is recovered so that the pre-captured volume well deforms on it to match the projections. The steps of generation and deformation are iteratively repeated based on the discrepancy between the generated and actual projections to refine the result.

Dataset and Preprocessing

The training of the generative network (i.e., volume generator learning) $100 was made on a library of reference 3D scans comprising a large dataset of 3500 CTs of patients with head-and-neck cancer, more exactly 2297 patients from the publicly available The Cancer Imaging Archive (TCIA) and 1203 from private internal data, after obtention of ethical approbations.

This data was split into 3000 cases for training, 250 for validation, and 250 for testing. CT scans were focused on the head and neck region above shoulders, with a resolution of 80×96×112, and centered on the mouth after automatic segmentation using a pre-trained U-Net. The CTs were preprocessed by min-max normalization after clipping between −1024 and 2000 Hounsfield Units (HU).

To evaluate the present approach, an external private cohort of 80 patients who had undergone radiotherapy for head-and-neck cancer was used, with their consent. Planning Computed Tomography (CT) scans were obtained for dose preparation, and Cone Beam Computed Tomography (CBCT) scans were obtained at each treatment fraction for positioning with full gantry acquisition. In radiotherapy, a planning CT capture is used to design the therapy plan, while daily 3D Cone-Beam CTs (CBCTs) are captured during treatment to ensure the patient's positioning matches this initial CT.

Figure 4:
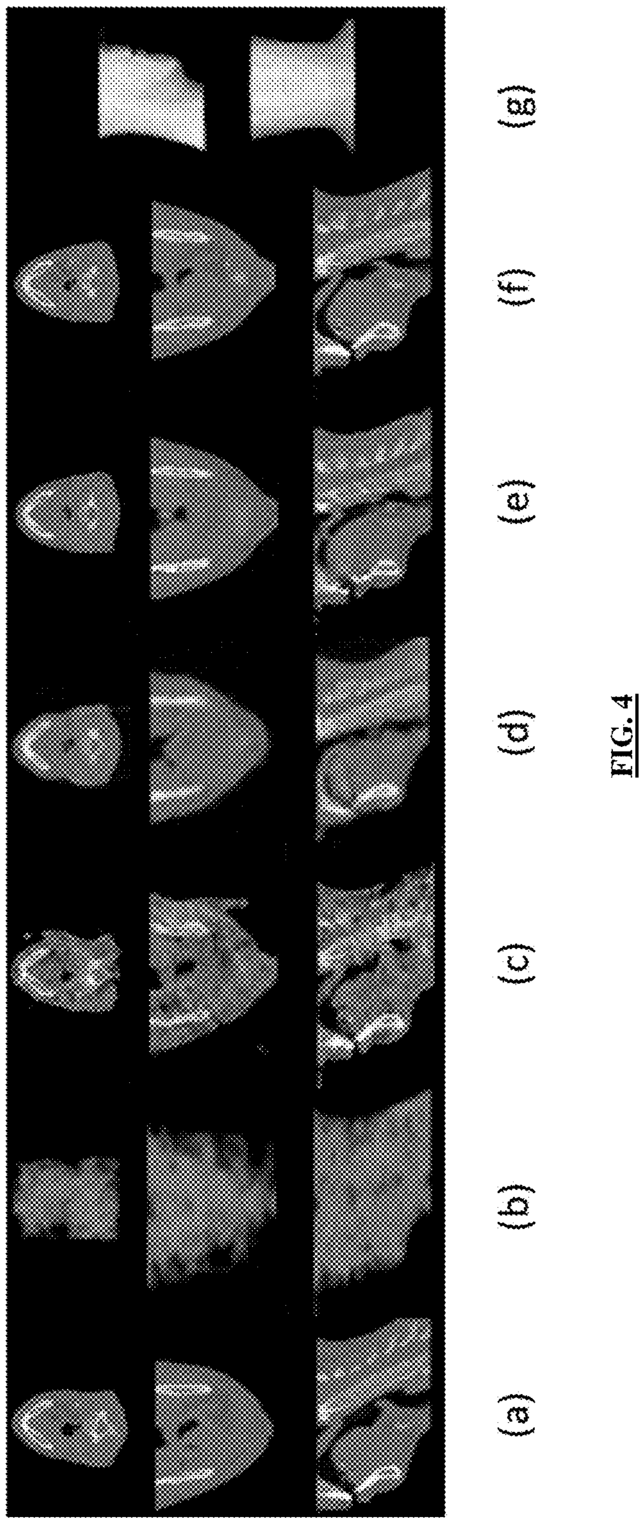
FIG. 4 is a visual comparison of 3D reconstructions from bi-planar projections by the present model and baselines.

As can be seen in FIG. 4, all these cases are challenging as there are large changes between the original CT scan and the CBCT scans. These cases were automatically identified by comparing the CBCTs with the planning CTs. To compare the reconstruction obtained with the present method in the calibrated HU space, the planning CTs were registered on the CBCTs by deformable registration with MRF minimization. 3D volumes were hence obtained as virtual CTs that were considered as ground truths for the reconstructions after normalization. From these volumes, projections were generated using the projection module A previously described.

In examples where the goal was to reconstruct the head-and-neck area using only two projections and the pre-acquired volume (i.e., the examples according to the third embodiment discussed above) the dataset and preprocessing aspect of the volume generator learning is as discussed above. Furthermore, longitudinal Radiotherapy data including planning CTs with their subsequent CBCTs were gathered with the patients' consent. As known per se, longitudinal radiotherapy data refers to information collected over time from patients undergoing radiotherapy treatment.

Figure 6:
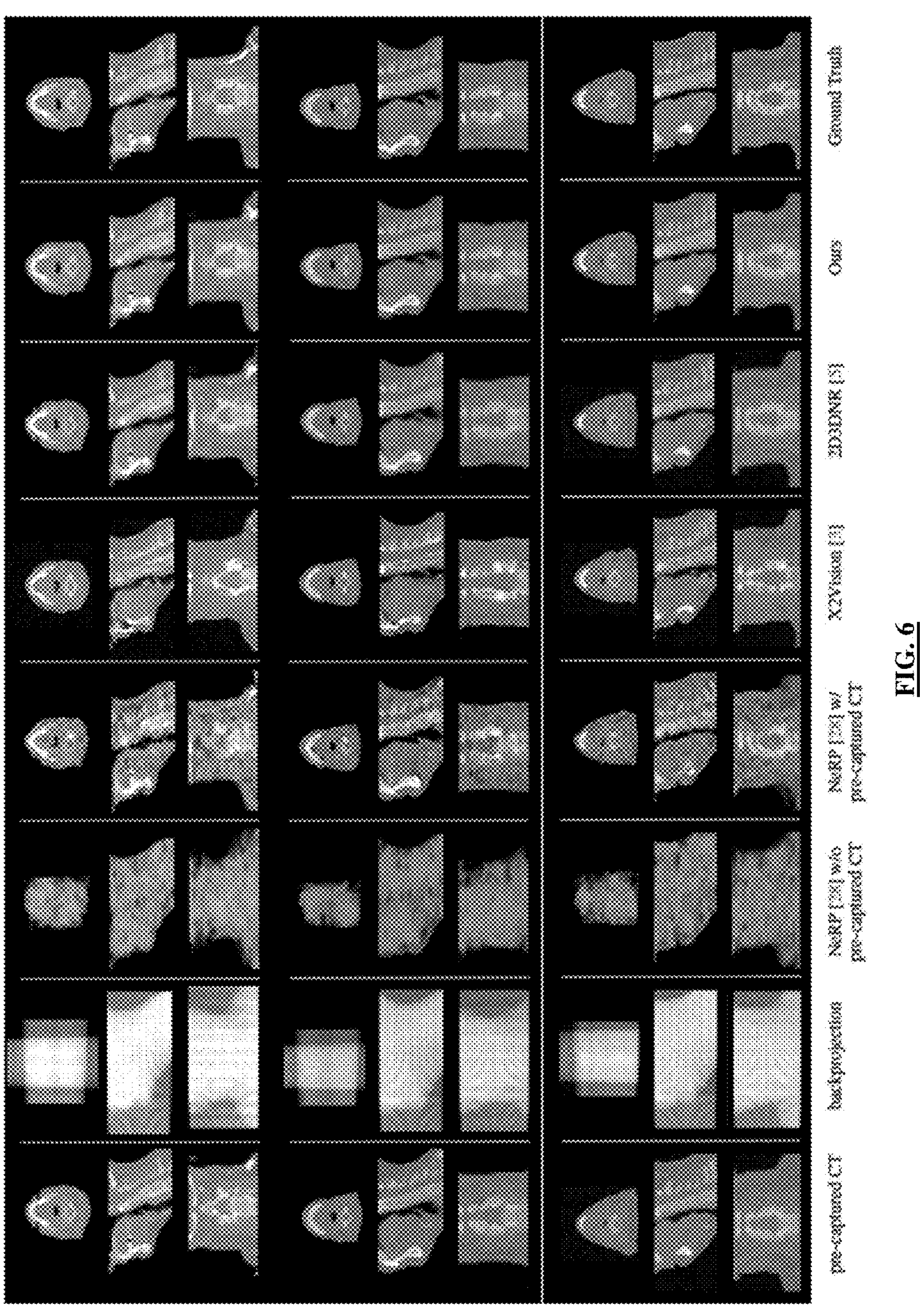
FIGS. 6, and 7 are visual comparisons of 3D reconstructions from bi-planar projections by the present model and baselines.
Figure 9:
FIG. 9 is a visual comparison of 3D reconstructions from bi-planar projections by the present model and baselines.

As depicted in FIG. 6 and FIG. 9, notable differences emerge between the initial CT scans and subsequent CBCT scans, because of both treatment-induced alterations and patient pose variations. By aligning planning CTs with CBCTs using MRF minimization, 3D volumes as CTs were derived. Some of these volumes were used for training our 3D/3D deformable registration model and the rest for evaluating the predicted reconstructions by the different methods.

In examples related to the third embodiment, with patient consent, the planning CT scans and subsequent CBCT scans from 242 patients across two medical centers were compiled, one contributing 177 and the other 65 cases. These datasets, distinct in protocols and scanning equipment, offered a diverse basis for assessing our methods in varied clinical settings. More precisely, to train the 3D/3D deformable registration model, 146 patients for training, 16 for validation, and 10 for testing were randomly selected. Each initial CT is paired with any subsequent CT from the same patient to obtain a large training set.

Implementation Details

Regarding the manifold learning, Pytorch was used to implement the present model, based on StyleGAN2. It has a starting base layer of 256×5×6×7 and includes four (stages of) upsamplings with 3D convolutions and filter maps of 256, 128, 64, 32. Eight fully-convolutional layers were also used with dimension 512 and an input latent vector of dimension 512, with tanh function as output activation. To optimize the present model, lazy regularization and style mixing were used, and a 0.2 probability was added for generating images without Gaussian noise to focus on embedding the most information. In other words, images were generated with a 20% chance of omitting Gaussian noise, so to enhance information embedding. The discriminator was augmented with vertical and depth-oriented flips, rotation, scaling, motion blur and Gaussian noise at a probability of 0.2. The training used mixed precision on a single GPU Nvidia Geforce GTX 3090 with a batch size of 6, and the generator, discriminator, and mapping networks were optimized using Adam at learning rates 6e−5 (for both generator and the discriminator) and 1e−5 (for the mapping network) to avoid mode collapse and unstable training. After a training period of 4 weeks, stabilization of the Fréchet Inception Distance (FID) and Multi-scale Structural Similarity (MS-SSIM) on the validation set was observed.

Regarding the 3D/3D deformable registration training, the VoxelMorph architecture is employed. The channel depths in the encoder are set at 16-32-32-32, and in the decoder at 32-32-32-32-32-16-16, mirroring the configurations of the original architecture. Initial large CT scans are resized to 96×128×160(2.67×3×3.5 $mm^3$) for GPU compatibility. Subsequent scans, focusing on the reconstruction area, of shape 80×96×112 (1.3×2.4×1.9 $mm^3$) are downsampled and padded to match initial scan dimensions. Masks are created for targeted training in this region. At test time, the area of interest is extracted and resized to its original dimensions.

The loss function weights the mean squared error on the reconstruction area and the gradient regularization term with $\lambda_{sim}$=1 and $\lambda_{grad}$=1e−2 respectively. The implementation incorporates 7 integration steps on velocity fields, downsampled by half, to ensure diffeomorphic displacement fields with computational efficiency. The model, implemented in PyTorch, was optimized using Adam with a learning rate of 1e−4. Training comprised batches of 4 pairs of volumes for up to 1500 epochs. Nevertheless, to circumvent overfitting and to ensure the model's adaptability, the implementation uses an early stopping strategy, causing the training to halt at the 410th epoch, corresponding to 1 day of training.

Regarding the 3D reconstruction (i.e., volume recovery), the optimization on GPU V100 PCI-E was performed using the Adam optimizer, with learning rate of 1e−3. By grid search on the validation set of ten patients, the best weights that well balance between structure and fine-grained details were selected, $\lambda_2$=10, $\lambda_p$=0.1, $\lambda_w$=0.1, $\lambda_c$=0.05, $\lambda_n$=10. 100 optimization steps were performed starting from the mean of the mapped latent space, which takes 25 seconds, enabling clinical use.

For the volume recovery according to the third embodiment, same weights for both the warm-up optimization, which excluded the pre-captured volume, and the main optimization is used. Through a grid search on the validation set, a warm-up of 10 steps was found to be optimal. With smaller values, deformations often started from aligned volumes, leading to suboptimal results, while for higher values and an extended warm up, like 50 steps, the optimization is trapped in local minima, yielding results too similar to a reconstruction with solely generative model followed by one deformation. The optimization according to this implementation runs for 100 steps, starting from the average latent vector.

Results

The present model's ability to learn the low-dimensional manifold was tested by using: the Frechet Inception Distance (FID) to measure the distance between the distribution of generated volumes and real volumes, and Multi-scale Structural Similarity (MS-SSIM) to evaluate volumes' diversity and quality. A 3D FID of 46 and a MS-SSIM of 0.92 were obtained. For reference, compared to 3DStyleGAN, the present model achieved half their FID score on another brain MRI dataset, with comparable MS-SSIM. This may be due to a more complex architecture, discriminator augmentation, or simpler anatomy.

Furthermore, the present method was compared against the main feed-forward method X2CT-GAN and the neural radiance fields with prior image embedding method NeRP meant for modest sparsely-sampled reconstruction. Recent methods like were excluded because they provide only minor improvements compared to X2CT-GAN and have similar constraints to feedforward methods. Additionally, no public implementation is available.

The present method's performance was evaluated with biplanar projections and focused on positioning imaging for radiotherapy. $\lambda_s$ previously described FIG. 4 compares the reconstruction obtained with the present method with those obtained by the baselines from biplanar projections. It can be seen that the present method achieves better fitting of the patient structure, including bones, tissues, and air separations, almost matching the real CT volume. X2CT-GAN produced realistic structures, but failed to match the actual structures as it does not enforce consistency with the projections. In some clinical procedures, an earlier CT volume of the patient may be available and can be used as an additional input for NeRP. Without a previous CT volume, NeRP lacks the necessary prior to accurately solve the ill-posed problem. Even when initialized with a previous CT volume, NeRP often fails to converge to the correct volume and introduces many artifacts when few projections are used. In contrast, the present method is more versatile and produces better results.

Quantitative metrics (PSNR and SSIM) were used to evaluate reconstruction error and human perception, respectively. Table 1 shows these metrics for the present method and baselines with 1 to 8 cone beam projections.

Deviation from projections, as in X2CT-GAN, leads to inaccurate reconstruction. However, relying solely on projection consistency is inadequate for this ill-posed problem. NeRP matches projections but cannot reconstruct the volume correctly. The present approach balances between instant and iterative methods by providing a reconstruction in 25 seconds with 100 optimization steps, while ensuring maximal consistency. In contrast, NeRP requires 7 minutes, and X2CT-GAN produces structures instantly but unmatching. Clinical CBCT acquisition and reconstruction by FDK take about 1-2 minutes and 10 seconds respectively. The present approach significantly reduces clinical time and radiation dose by using instant biplanar projections, making it promising for fast 3D visualization towards complex positioning.

For evaluating our 3D/3D deformable registration model, the mean squared error specifically within the designated region of interest was calculated. The mean squared error (MSE) recorded was 6.7e−4 for the training dataset and 1e−3 for the validation dataset. Using the same group of 70 patients previously selected for evaluating the complete method of volume recovery, in the targeted zone of interest, a PSNR of 37.64 (+2.50) and a SSIM of 0.99 (+0.01) was achieved.

TABLE 1

| | 1 Projection | | 2 Projections | |
|---|---|---|---|---|
| Method | PSNR (dB) ↑ | SSIM ↑ | PSNR (dB) ↑ | SSIM ↑ |
| NeRP (w/ prior volume) | 14.8 (±2.7) | 0.12 (±0.10) | 18.4 (±3.8) | 0.17 (±0.10) |
| NeRP (w/ prior volume) | 22.5 (±3.2) | 0.29 (±0.07) | 23.5 (±3.5) | 0.30 (±0.06) |
| X2CT-GAN | 20.7 (±2.4) | 0.57 (±0.07) | 21.8 (±2.5) | 0.72 (±0.08) |
| Present method | 23.2 (±2.8) | 0.79 (±0.09) | 25.8 (±3.2) | 0.85 (±0.10) |
| | 4 Projections | | 8 Projections | |
| NeRP (w/o prior volume) | 19.9 (±2.6) | 0.21 (±0.04) | 20.0 (±2.5) | 0.23 (±0.05) |
| NeRP (w/ prior volume) | 24.2 (±2.7) | 0.32 (±0.05) | 24.9 (±4.9) | 0.34 (±0.08) |
| Present Method | 28.2 (±3.5) | 0.89 (±0.10) | 30.1 (±3.9) | 0.92 (±0.11) |

Table 2 reports the quantitative results for examples where the goal was to reconstruct the head-and-neck area using only two projections and the pre-acquired volume (i.e., the examples according to the third embodiment discussed above).

Figure 7:
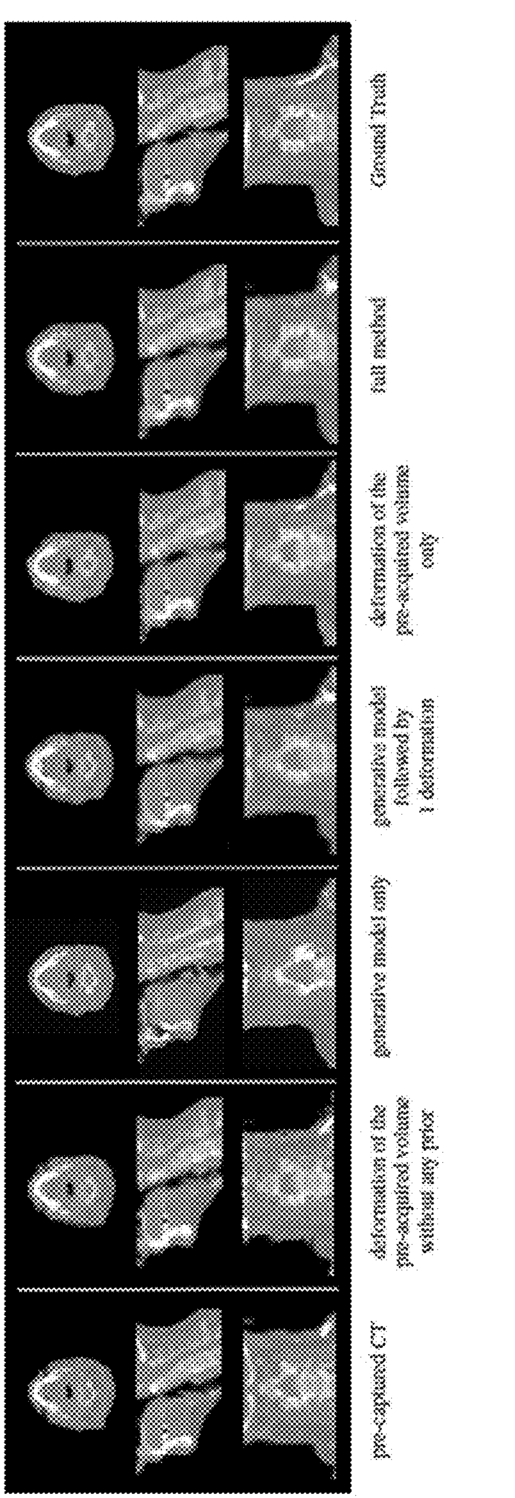

Below methods are compared and their results are discussed. FIG. 7 compares visually such a comparison. reconstruction to these methods on several examples.

TABLE 2

| Method | PSNR (dB) ↑ | SSIM ↑ |
|---|---|---|
| Backprojection | 10.29 (±0.5) | 0.23 (±0.01) |
| NeRP (w/o) [22] | 19.81 (±1.7) | 0.21 (±0.03) |
| NeRP (w/) [22] | 25.32 (±1.6) | 0.34 (±0.02) |
| X2Vision [3] | 27.80 (±1.4) | 0.89 (±0.03) |
| 2D3DNR [5] | 29.07 (±1.6) | 0.92 (±0.02) |
| Ours | 33.23 (±0.62) | 0.96 (±0.01) |

| | Dice ↑ | |
|---|---|---|
| Method | Mouth | Larynx |
| 2D3DNR [5] | 0.91 (±0.03) | 0.80 (±0.07) |
| Ours | 0.95 (±0.01) | 0.91 (±0.02) |

| | Rigid Registration Error (6 DoF) | |
|---|---|---|
| Method | Rotation (°) ↓ | Translation (mm) ↓ |
| 2D3DNR [5] | 0.52 (±0.29) | 0.88 (±0.45) |
| X2Vision [3] | 0.45 (±0.31) | 0.50 (±0.26) |
| Ours | 0.16 (±0.15) | 0.20 (±0.07) |

Table 2 presents metrics on volumes from two projections by previous methods and a method according to the invention approach. Standard deviations are provided in parentheses. (w/) and (w/o) stand for the use or not of the pre-captured volume respectively.

As seen above, the reconstruction performance is assessed using two quantitative metrics: PSNR, which quantifies reconstruction error, and SSIM, which gauges the perceptual quality of the images. The evaluation accuracy of the deformation between the pre-acquired volume and the recovered volume for the two methods that estimate this deformation: 2D3DNR and the method of the present disclosure. To this end, the Dice score for the mouth and the larynx, two structures that are likely to deform significantly. To compute it, the implementations segment these structures on the pre-captured volumes and the recovered volumes using a trained U-Net model using about 1000 head-and-neck CTs.

Additionally, the implementations compare the 3D rigid registration differences between the initial full CT scans and the reconstructions against the ground truth, including variations in rotation angles and translations across all axes. This comprehensive analysis helps to underline the precision of the method in capturing and reconstructing the nuanced deformations of critical anatomical features.

The backprojection method is a very simple baseline method. It estimates the value of each voxel as the average of the values at the projected voxel locations in the input X-ray projections. When enough input projections are available, this method can provide satisfying results. However, it fails when only two projections are used.

The NeRP method optimizes the 3D volume to match the projections. It also struggles when very few projections are given since they lack prior anatomical knowledge. Even when conditioned on the pre-captured volume, it is often not able to eliminate the many artefacts.

It has been also considered the recent X2Vision method to highlight the advantages of exploiting the pre-captured volume as we do—which X2Vision does not. Essentially, X2Vision does not introduce integration of the pre-captured volume. It provides a reasonable reconstruction but still misses important details.

2D3DNR predicts in a feedforward way the deformation between the pre-captured 3D volume and the new one given the pre-captured volume itself and the available projections. Since the original code was unavailable, a same VoxelMorph backbone as the present method is used to reimplement the 3D/3D registration method. The volumes predicted by 2D3DNR do not reproject well on the input projections in general. Because it is a feedforward method, it also tends to generalize poorly. Our method recovers better the deformation of the tissues.

Like X2Vision and NeRP, the present method optimizes on the volume during inference for consistency with the input projections, which helps generalization. It also introduces a prior on the anatomical volume thanks to its GANs, in a way related to X2Vision. It has however an original way to exploit the pre-acquired volume by learning a prior on how this volume deforms. This contrast with 2D3DNR, which simply takes this volume as input, and with NeRP, which uses this volume only as conditioning. The method of the present invention adopts an optimization strategy to inform the deformation prior, significantly enhanced by the capabilities of the generative model. This model lays down a realistic 3D scaffold for the optimization process, ensuring the deformations are not just plausible but supported by the anatomical description of the generative model. This leads to reconstructions that are markedly more precise, showcasing a significant leap forward in the fidelity of anatomical reconstruction techniques.

Regarding FIG. 4: (a) represents a previous original CT scan; (b) reconstruction obtained with a NeRP method without a previous CT scan; (c) represents a reconstruction obtained with a NeRP method with a previous CT scan; (d) represents a reconstruction obtained with a X2CT-GAN method; (e) represents a reconstruction obtained with the present method as previously described in the first embodiment; (f) represents the CT volume deformed on the CBCT volume; and (g) represents the biplanar projections of the CT volume deformed on the CBCT volume.

In this FIG. 4, it can be seen that without a previous CT volume, NeRP fails by lack of constraints (see (b)). When initialized with an earlier CT (a), NeRP tends to create artefacts to match the projections rather than really change the anatomy (see (c)). The present method (e) produces better matching structures than X2CT-GAN (d), almost matching the CT volume deformed on the CBCT volume (f) and (g).

FIG. 6 presents a visual analysis of recovered volumes from two projections by previous methods (columns 1 to 6) and an approach based on the third embodiment discussed above (column 7). Respective ground truth is also presented (column 8).

In the absence of a pre-captured CT volume, NeRP struggles due to lack of constraints. When exploiting the pre-captured CT volume, NeRP still tends to introduce artifacts in an attempt to align with the projections and alters the anatomy without ensuring anatomical accuracy. In contrast to X2Vision, the method of this invention predicts a reconstruction that captures patient-specific details and nuances. 2D3DNR results in deformations that do not adequately match the anatomy.

Ablation Study

Table 3 presents an ablation study highlighting the benefits of the two priors. "deformation of the pre-acquired volume without any prior" only uses the pre-acquired volume and no prior. "generative model only" does not use the pre-acquired volume. "generative model followed by 1 deformation" uses the pre-acquired volume only after the independent reconstruction phase conducted by the generative model. "deformation of the pre-acquired volume only" only uses the pre-acquired volume and the prior on its deformations. Standard deviations are provided in parentheses.

TABLE 3

| Method | PSNR (dB) ↑ | SSIM ↑ |
|---|---|---|
| deformation of the pre-acquired volume without any prior | 27.04 (±1.9) | 0.88 (±0.03) |
| generative model only | 27.80 (±1.4) | 0.88 (±0.03) |
| generative model followed by 1 deformation | 29.24 (±1.8) | 0.92 (±0.02) |
| deformation of the pre-acquired volume only | 30.75 (±1.19) | 0.93 (±0.01) |
| full method | 33.23 (±0.62) | 0.96 (±0.01) |

In other words, four variants have been considered:

"Deformation of the pre-acquired volume without any prior": This version returns volume W(ν–, ϕ*) with:

$$\phi^* = \underset{\phi}{\operatorname{argmin}} \sum_i L_i(W(v^-, \phi), I_i)$$

where $W(v^-, \phi)$ applies a deformation field ϕ to the pre-acquired volume ν–. It estimates the deformation that aligns the pre-acquired volume with the projections, without any prior. Without prior on the volume nor on the deformations, deformations tend to be erratic, blending structures and leading to artifacts that compromise anatomical accuracy.

"generative model only": This version returns ν(g*) with $$g^* = \underset{g}{\operatorname{argmin}} \sum_i L_i(v(g), I_i) + R(g).$$

It uses only the prior on the reconstructed volume and corresponds to the X2Vision method.

"Generative model followed by 1 deformation": This version returns volume S(ν–, ν(g*)) with g* retrieved by optimizing Eq. (8). This approach deforms the pre-acquired volume to fit the generative model's reconstruction, introducing patient-specific details but potentially retaining initial mismatches. This shows the advantage of combining the volume prior and deformation prior during optimization.

"Deformation of the pre-acquired volume only": This version returns volume $S(v^-, v^*)$ with:

$$v^* = \underset{v}{\operatorname{argmin}} \sum_i L_i(S(v^-, v), I_i)$$

where v is a volume represented by a voxel grid, with each voxel encompassing an intensity to optimize. This method uses only the pre-acquired volume and our prior on its deformations. This results in local deformations that are not anatomically realistic, such as bone extensions or body contour distortions, stemming from its lack of anatomical prior.

These quantitative results clearly show that the two priors of the present method are complementary.

FIG. 7 presents a visual comparison of the various methods employed in this ablation study. Deforming the pre-acquired volume without any prior results in erratic and anatomically inconsistent changes. Reconstruction solely with the generative model may overlook details and lead to mismatches. Deforming the pre-acquired volume on it introduces patient-specific features but may retain initial misalignments. While introducing prior on deformation aids guiding the direction process, it leads to unnatural distortions of body contour and bone structures. Our method, by leveraging both anatomical and deformation priors, yields more realistic and anatomically preserving results.

Inference Time

Table 4 provides a comparison of inference time for the different methods. Our method recovers high-quality volumes in only 1 minute. While some other methods are faster, the trade-off fidelity/runtime is well acceptable as clinical CBCT acquisition and FDK reconstruction currently requires more than 2 minutes.

TABLE 4

| Method | Inference Time |
|---|---|
| Backprojection | <0.5 sec |
| NeRP (w/o prior volume) | 4 min |
| NeRP (w/prior volume) | 7 min |
| X2Vision | 30 sec |
| 2D3DNR | <0.5 sec |
| Ours | 1 min |

CONCLUSION

The present method proposes a new unsupervised method for 3D reconstruction from biplanar X-rays using a deep generative model to learn the structure manifold and retrieve the maximum a posteriori volume with the projections, leading to state-of-the-art reconstruction. The present approach is fast, robust, and applicable to various human body parts, making it suitable for many clinical applications, including positioning and visualization with reduced radiation.

Future hardware improvements may increase resolution, and the present approach could benefit from other generative models like latent diffusion models. This approach may provide coarse reconstructions for patients with rare abnormalities, as most learning methods, but a larger dataset or a developing a prior including tissue abnormalities could improve robustness.

Embodiment of the Device

Figure 5:
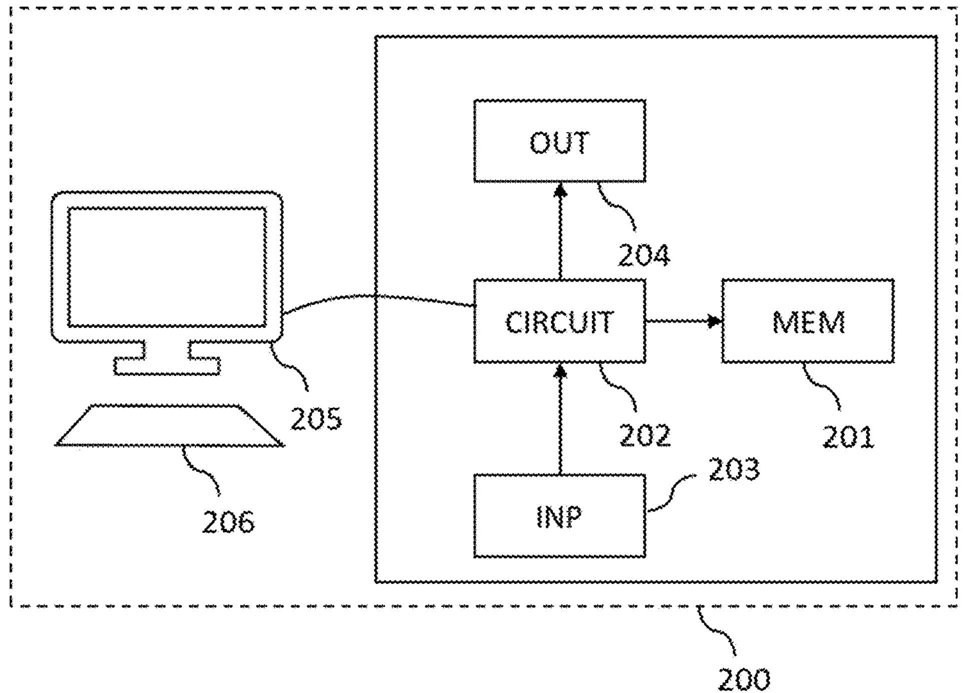
FIG. 5 illustrates a device for reconstructing a 3D image of a human body part studied of a subject from at least one 2D projection of the human body part studied of said subject according to the method of FIG. 1 or 2, or 8.

The method for reconstructing a 3D image of a human body part, as previously described, may be implemented with a device 200 such as illustrated on FIG. 5.

In these embodiments, the device 200 comprises a computer, this computer comprising a memory 201 to store program instructions loadable into a circuit and adapted to cause a circuit 202 to carry out steps of the method of FIG. 1 or FIG. 2 when the program instructions are run by the circuit 202. The memory 201 may also store data and useful information for carrying steps of the present invention as described above.

The circuit 202 may be for instance:

a processor or a processing unit adapted to interpret instructions in a computer language, the processor or the processing unit may comprise, may be associated with or be attached to a memory comprising the instructions, or the association of a processor/processing unit and a memory, the processor or the processing unit adapted to interpret instructions in a computer language, the memory comprising said instructions, or an electronic card wherein the steps of the invention are described within silicon, or a programmable electronic chip such as a FPGA chip (for «Field-Programmable Gate Array»).

The computer may also comprise an input interface 203 for the reception of input data and an output interface 204 to provide output data. Examples of input data may be the library of reference 3D scans or the at least one received 2D projection of the human body part previously acquired by an imaging apparatus, and output data may be the reconstructed 3D image of the human body part studied, or a synthetic 3D image the human body part generated by the generative model, or the at least one synthetic 2D projection generated during the process of the method.

To ease the interaction with the computer, a screen 205 and a keyboard 206 may be provided and connected to the computer circuit 202.

Furthermore, computer programs implementing the method of the present embodiments can commonly be distributed to users on a distribution computer-readable storage medium such as, but not limited to, an SD card, an external storage device, a microchip, a flash memory device, a portable hard drive and software websites. From the distribution medium, the computer programs can be copied to a hard disk or a similar intermediate storage medium. The computer programs can be run by loading the computer instructions either from their distribution medium or their intermediate storage medium into the execution memory of the computer, configuring the computer to act in accordance with the method of this disclosure. All these operations are well-known to those skilled in the art of computer systems.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD− ROMS, CD− Rs, CD+ Rs, CD− RWs, CD+ RWs, DVD− ROMs, DVD− Rs, DVD+ Rs, DVD− RWs, DVD+ RWs, DVD− RAMs, BD− ROMs, BD− Rs, BD− R LTHs, BD− Res, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

Embodiment of the Therapy Method

The method for reconstructing a 3D image of a human body part and the device 200, as previously described, may be implemented in a therapy method wherein, a 3D image of the human body part of a patient necessitated therapy, like radiotherapy, is required in order to keep track of the impact of the therapy and/or adapt treatment such as planning the radiotherapy.

In some embodiment, the therapy method comprises:

reconstructing a 3D image of the human body part requiring therapy according to the method for reconstructing a 3D image of a human body as previously described; and determining an appropriate dose and a right positioning before applying a treatment, like radiotherapy for example.

A person skilled in the art will readily appreciate that various parameters disclosed in the description may be modified and that various embodiments disclosed may be combined without departing from the scope of the invention. Of course, the present invention is not limited to the embodiments described above as examples. It can be extended to other variants.

The invention claimed is:

1. A computer-implemented method for reconstructing a 3D image of a human body part studied of a subject from at least one 2D projection of the human body part studied of said subject, said method comprising:

receiving a first set of latent variables as input data;

training a generative network based on a library of reference 3D scans of the corresponding human body part to obtain a trained generative model for reconstructing 3D images configured to receive the first set of latent variables as input;

receiving at least one 2D projection of the human body part studied of the subject;

obtaining an optimized first set of latent variables by optimizing values of the first set of latent variables by iteratively:

i) generating with the trained generative model a synthetic 3D image of the studied human body part using the first set of latent variables;

ii) generating at least one synthetic 2D projection of the synthetic 3D image, the at least one synthetic 2D projection being representative of the at least one received 2D projection of the studied human body part;

iii) computing an error between the at least one synthetic 2D projection and the at least one received 2D projection of the studied human body part and modifying values of the first set of latent variables for minimizing the error; and generating a reconstructed 3D image of the studied human body part with the trained generative model using said optimized first set of latent variables.

2. A computer-implemented method for reconstructing a 3D image of a human body part studied of a subject from at least one 2D projection of the human body part studied of said subject and at least one 3D radiology image of the human body part studied of the subject, said method comprising:

receiving a first set of latent variables as input data;

receiving a generative network trained according to claim 1;

receiving a trained spatial transformer;

receiving at least one 2D projection of the human body part studied of the subject;

receiving at least one 3D radiology image of the human body part studied of the subject;

obtaining a further optimized first set of latent variables by optimizing values of the first set of latent variables by iteratively:

i) generating with the trained generative model a synthetic 3D image of the studied human body part using the first set of latent variables;

ii) applying a deformable registration of said at least one 3D radiology image to match the synthetic 3D image using a spatial transformer thereby obtaining a deformed 3D radiology image;

iii) generating at least one synthetic 2D projection of the deformed 3D radiology image, the at least one synthetic 2D projection being representative of the at least one received 2D projection of the studied human body part;

iv) computing an error between the at least one synthetic 2D projection and the at least one received 2D projection of the studied human body part and modifying values of the first set of latent variables for minimizing the error; and generating a further reconstructed 3D image of the studied human body part with the trained generative model and said trained spatial transformer using said further optimized first set of latent variables.

3. The computer-implemented method according to claim 1, wherein the generative network is one of: a Variational Autoencoder (VAE), a Generative Adversarial Network (GAN), an Autoregressive model (AR), a Flow-based Model (Normalizing Flow), an Energy-Based Model (EBM), a Restricted Boltzmann Machine (RBM), a ladder network, or a diffusion model.

4. The computer-implemented method according to claim 3, wherein the generative network is a style-based generative adversarial network using 3D convolutions.

5. The computer-implemented method according to claim 1, wherein a Gaussian noise is added and optimized during the optimization of the first set of latent variables, as a second set of latent variables, the generative model being also configured to receive the second set of latent variables.

6. The computer-implemented method according to claim 1, wherein the first set of latent variables is a latent vector which is computed from an initial latent vector mapped using a learned network, so that the first set of latent variables controls a global structure of the 3D images generated by the trained generative model at different scales.

7. The computer-implemented method according to claim 1, wherein the optimization of the first set of latent variables, and of the second set of latent variables when available, is a Bayesian-like optimization.

8. The computer-implemented method according to claim 1, wherein the at least one synthetic 2D projection being representative of the at least one received 2D projection of the studied human body part corresponds to a same anatomic area observed in the received and synthetic projections, which can be defined by same orientation and/or same localization.

9. The computer-implemented method according to claim 1, wherein the at least one 2D received projection of the studied human body part comprises advantageously between one to hundreds, preferably two to hundreds, and more preferably two 2D projections to a dozen of 2D projections, and wherein for each received 2D projection a corresponding and representative synthetic 2D projection is generated during step ii.

10. The computer-implemented method according to claim 9, wherein the received 2D projections of the studied human body part are different, being acquired by different imaging apparatuses, or by the same apparatus with different orientations, e.g. according to the sagittal, axial and/or coronal orientation, and/or at different time intervals, e.g. before or after the application of a treatment such as a radiotherapy.

11. The computer-implemented method according to claim 1, wherein the library of reference 3D scans of the corresponding human body part is preprocessed to identify a region of interest corresponding to a specified anatomic area comprising the studied human body part, before the training step, and the at least one received 2D projection is preprocessed in the same way.

12. The computer-implemented method according to claim 1, wherein the library of reference 3D scans of the corresponding human body part is preprocessed to normalize the human body part 3D scans, before the training step, and the at least one received 2D projection of the studied human body part is normalized on the same ranging scale.

13. The computer-implemented method according to claim 1, wherein the method further comprises:

receiving a 3D image of the human body part studied of the subject; and an initialization step wherein, before optimizing the first set of latent variables:

a first synthetic 3D image is generated by the trained generative model;

the first synthetic 3D image and the received 3D image are compared; and the initial values of the first set of latent variables, and of the second set of latent variables when available, are initialized by minimizing a different between the first synthetic 3D image and the received 3D image.

14. The computer-implemented method according to claim 1, wherein the library of reference 3D scans used to train the generative network is trained is a library of computed tomography scans.

15. The computer-implemented method according to claim 1, wherein the studied human body part is head and/or neck.

16. A device comprising a processor configured to carry out a computer-implemented method for reconstructing a 3D image of a human body part studied of a subject from at least one 2D projection of the human body part studied of said subject, said method comprising:

receiving a first set of latent variables as input data;

training a generative network based on a library of reference 3D scans of the corresponding human body part to obtain a trained generative model for reconstructing 3D images configured to receive the first set of latent variables as input;

receiving at least one 2D projection of the human body part studied of the subject;

i) obtaining an optimized first set of latent variables by optimizing values of the first set of latent variables by iteratively:

ii) generating with the trained generative model a synthetic 3D image of the studied human body part using the first set of latent variables;

iii) generating at least one synthetic 2D projection of the synthetic 3D image, the at least one synthetic 2D projection being representative of the at least one received 2D projection of the studied human body part;

iv) computing an error between the at least one synthetic 2D projection and the at least one received 2D projection of the studied human body part and modifying values of the first set of latent variables for minimizing the error;

v) generating a reconstructed 3D image of the studied human body part with the trained generative model using said optimized first set of latent variables (S400).

17. The device according to claim 16, wherein the generative network is one of: a Variational Autoencoder (VAE), a Generative Adversarial Network (GAN), an Autoregressive model (AR), a Flow-based Model (Normalizing Flow), an Energy-Based Model (EBM), a Restricted Boltzmann Machine (RBM), a ladder network, or a diffusion model.

18. The device according to claim 17, wherein the generative network is a style-based generative adversarial network using 3D convolutions.

19. The device according to claim 16, wherein a Gaussian noise is added and optimized during the optimization of the first set of latent variables, as a second set of latent variables, the generative model being also configured to receive the second set of latent variables.

20. The device according to claim 16, wherein the first set of latent variables is a latent vector which is computed from an initial latent vector mapped using a learned network, so that the first set of latent variables controls a global structure of the 3D images generated by the trained generative model at different scales.

* * * * *